US012490734B2

(12) United States Patent
Werner et al.

(10) Patent No.: US 12,490,734 B2
(45) Date of Patent: Dec. 9, 2025

(54) TREATMENT SYSTEM FOR PLANT SPECIFIC TREATMENT

(71) Applicant: BASF AGRO TRADEMARKS GMBH, Ludwigshafen (DE)

(72) Inventors: Nicolas Werner, Cologne (DE); Clemens Christian Delatree, Münster (DE); Hubert Schmeer, Cologne (DE); Carvin Guenther Scheel, Cologne (DE)

(73) Assignee: BASF AGRO TRADEMARKS GMBH, Ludwigshafen Am Rhein (DE)

( * ) Notice: Subject to any disclaimer, the term of this patent is extended or adjusted under 35 U.S.C. 154(b) by 10 days.

(21) Appl. No.: 18/030,911

(22) PCT Filed: Oct. 14, 2021

(86) PCT No.: PCT/EP2021/078453
§ 371 (c)(1),
(2) Date: Apr. 7, 2023

(87) PCT Pub. No.: WO2022/079172
PCT Pub. Date: Apr. 21, 2022

(65) Prior Publication Data
US 2023/0371493 A1    Nov. 23, 2023

(30) Foreign Application Priority Data
Oct. 14, 2020   (EP) ..................................... 20201800

(51) Int. Cl.
*A01M 21/00*   (2006.01)
*A01M 21/04*   (2006.01)
*G05B 19/4155* (2006.01)

(52) U.S. Cl.
CPC ....... *A01M 21/043* (2013.01); *G05B 19/4155* (2013.01); *G05B 2219/45107* (2013.01)

(58) Field of Classification Search
CPC ..... B05B 12/12; B05B 12/122; B05B 12/124; B05B 12/126; A01M 21/04; A01M 21/043
See application file for complete search history.

(56) References Cited

U.S. PATENT DOCUMENTS 10,713,484 B2    7/2020  Polzounov et al.
11,023,725 B2 *  6/2021  McKenna ................ G06K 9/00
(Continued)

FOREIGN PATENT DOCUMENTS

EP       3482619 A1    10/2018
WO   2019/002077 A1     1/2019

OTHER PUBLICATIONS

International Search Report and Written Opinion of International Application No. PCT/EP2021/078453 mailed Jan. 7, 2022, 7 pgs.

*Primary Examiner* — Joshua J Michener
*Assistant Examiner* — Henry Hooper Mudd
(74) *Attorney, Agent, or Firm* — ArentFox Schiff LLP

(57) ABSTRACT

The present invention relates to a system and a method for operating a treatment device (120) applying a treatment product to an agricultural area, the method comprising: obtaining (S210) at least one dataset of an area of interest within the agricultural area (110) to a control system (12.10); determining (S220), by the control system (12.10), from the at least one dataset a plant indicator, wherein a basic threshold for triggering application of the treatment product is dynamically adjustable in relation to the plant indicator; and providing a control signal (S230), by the control system, to control the treatment device (120) based on the determined plant indicator and the threshold for triggering application of the treatment product.

19 Claims, 4 Drawing Sheets

(56) References Cited

U.S. PATENT DOCUMENTS

| | | | |
|---|---|---|---|
| 11,071,991 B2 | 7/2021 | Serrat et al. | |
| 11,147,258 B2 * | 10/2021 | Grimm | A01M 7/00 |
| 11,423,662 B2 * | 8/2022 | Neumann | G06V 20/56 |
| 11,440,659 B2 * | 9/2022 | Lin | B64D 1/18 |
| 11,580,718 B2 * | 2/2023 | Padwick | G06V 10/20 |
| 2018/0116094 A1 * | 5/2018 | Redden | A01B 41/06 |
| 2018/0330165 A1 * | 11/2018 | Halligan | G06K 9/00 |
| 2020/0041639 A1 | 2/2020 | Luber et al. | |
| 2020/0221681 A1 * | 7/2020 | Schwaderer | A01M 7/00 |
| 2021/0406540 A1 | 12/2021 | Redden et al. | |
| 2022/0101554 A1 * | 3/2022 | Fu | G06T 7/73 |

* cited by examiner

TREATMENT SYSTEM FOR PLANT SPECIFIC TREATMENT

The present disclosure relates to a method for controlling a treatment device applying a treatment product to an agricultural area, respective control systems, treatment devices, computer program elements and machine-readable storage devices.

BACKGROUND

The general background of this disclosure is the treatment of plants in an agricultural area, which may be an agricultural field, a greenhouse, or the like. The treatment of plants, such as the actual crops or the like, may also comprise the treatment of weed present in the agricultural area, the treatment of the insects present in the agricultural area as well as the treatment of pathogens present in the agricultural area.

A semi-automated or fully automated plant treatment device, such as a robot, a smart sprayer, or the like, may be configured to treat the weed, the insects and/or the pathogens in the agricultural area based on ecological and economical rules. In order to automatically detect and identify the different objects to be treated, image analysis techniques, such as image recognition, may be used. For this purpose, the treatment device may carry an image capture device, such as a camera or the like. Further, for the actual plant treatment during operation, the treatment device may carry plant treatment means, such as spray nozzle, a tank, control means, etc. Controlling operation of the treatment device may be based on a decision logic, which may comprise e.g. a data processing unit and/or a control software etc., that is configured to obtain the images taken and to decide whether or not to treat an area of interest of the agricultural area.

WO2018208947A1 for instance discloses a plant treatment platform using a plant detection model to detect plants as the plant treatment platform travels through a field. The plant treatment platform applies the plant detection model to the pre-processed image data to generate bounding boxes for the plants. The plant treatment platform then can apply treatment to the plants based on the output of the machine-learned model.

EP3576526A1 discloses a weed control system for an agricultural sprayer comprising a camera and a spraying unit with several supply modules, a nozzle and a controller module to receive a weed species detection signal and to command the spraying of chemical agent. The weed control system also comprises a weed species identification unit with a communication module, a memory module and a processing module having several parallel processing cores.

WO2019226869A1 a farming machine including a number of treatment mechanisms treats plants according to a treatment plan as the farming machine moves through the field. The control system of the farming machine executes a plant identification model configured to identify plants in the field for treatment.

In existing systems, cases may occur where some weeds will not be treated, if the threshold is not reached, but the vegetation to be treated is critical. Problematic weeds that have a high negative impact on yield and food safety may hence not be treated at an early growth stage and remain on the field and the decision making must be improved.

SUMMARY OF THE INVENTION

Therefore, there is a need to provide means for improving plant treatment, particularly in terms of accuracy. It is accordingly an object of the present invention to provide more efficient and/or effective means for treating plants. This object is solved by the subject-matter of the independent claims.

According to a first aspect, provided herein is a method for operating or controlling a treatment device applying a treatment product to an agricultural area, the method comprising:

obtaining at least one dataset, such as an image, relating to an area of interest within the agricultural area to a control system, preferably the at least one dataset is obtainable or obtained in real-time while the treatment device travels through the agricultural area;

determining, by the control system, from the at least one dataset a vegetative indicator relating to real-time conditions on the agricultural area, preferably while the treatment device travels through the agricultural area, wherein a basic threshold for triggering application of the treatment product is dynamically adjustable or adjusted in relation to the vegetative indicator; and providing a control signal, by the control system, to control the treatment device based on the determined vegetative indicator and the threshold for triggering application of the treatment product and optionally controlling the treatment device.

In this way, the operation of the treatment device can be dynamically controlled based on the treatment condition derived from real-time data, such as an image. The threshold concept including a basic, optionally static threshold, which is adapted as needed based on the vegetative indicator allows for dynamic adjustments in a very simple manner while requiring minimum processing power on board of the treatment device. Here the vegetative indicator may be a plant, crop, insect and/or weed indicator.

According to a further aspect, provided herein is a method for operating or controlling a treatment device applying a treatment product to an agricultural area, the method comprising:

obtaining at least one dataset, such as an image, relating to an area of interest within the agricultural area to a control system, preferably the at least one dataset is obtainable or obtained in real-time while the treatment device travels through the agricultural area;

determining, by the control system, from the at least one dataset a vegetative indicator relating to a vegetative species and/or a vegetative type, in particular a weed indicator relating to a weed species and/or a weed type or insect indicator relating to an insect species and/or an insect type, wherein a basic threshold for triggering application of the treatment product is dynamically adjustable or adjusted in relation to the weed indicator; and providing a control signal, by the control system, to control the treatment device based on the determined vegetative indicator, in particular a weed indicator relating to a weed species and/or a weed type or insect indicator relating to an insect species and/or an insect type, and the threshold for triggering application of the treatment product and optionally controlling the plant treatment device.

In this way, the operation of the treatment device can be dynamically controlled based on the weed type, weed specie, insect specie or insect type determined. In particular, the weed/insect type or species can be used in an online, e.g. real-time, control mechanism of the treatment device for e.g. a real-time treatment decision, such as a spray decision.

Additionally, a simple threshold logic that is more robust and secure for application in the field is provided. Further, the treatment product, which may also be referred to in a more general manner as an agrochemical, may be delivered in a more targeted manner, which can reduce environmental impacts and/or can improve the sustainability and biodiversity of agricultural production systems. Compared to a fixed threshold, the amount of the treatment product used may be reduced, thereby providing a more economic and/or environmentally friendly treatment mechanism.

According to a further aspect, provided herein is a method for operating or controlling a treatment device applying a treatment product to an agricultural area, the method comprising:

obtaining at least one dataset, such as an image, relating to an area of interest within the agricultural area to a control system, preferably the at least one dataset is obtainable or obtained in real-time while the treatment device travels through the agricultural area;

determining, by the control system, from the at least one dataset a plant indicator relating to a plant number value and/or a plant size value, wherein a basic threshold for triggering application of the treatment product is dynamically adjustable or adjusted in relation to the plant indicator; and providing a control signal, by the control system, to control the treatment device based on the determined plant indicator and the threshold for triggering application of the treatment product and optionally controlling the treatment device.

According to another aspect, provided herein is a control system for controlling or operating a treatment device for applying a treatment product to an agricultural area, the control system is configured to perform the methods lined out above.

According to another aspect, provided herein is a treatment device for applying a treatment product to an agricultural area, the treatment device comprising:

at least one detection component, and the control system connected to the at least one detection component.

According to another aspect, provided herein is a computer program element, which when executed on a computing device or the control system, performs the method disclosed herein and is configured to carry out the methods lined out above, and/or to control or operate the control system or treatment device lined out above. In yet a further aspect the disclosure relates to a machine-readable storage device with executable instructions, which when executed on a computing device or the control system, performs the method disclosed herein and is configured to carry out the methods lined out above, and/or to control or operate the control system or treatment device lined out above.

As used herein, the agricultural area to be treated may be any plant or crop cultivation area, such as a field, a greenhouse, or the like. A plant may be a crop, a weed or any other plant present on the agricultural area.

As used herein, the treatment product, which may also be referred to as an agrochemical, may comprise one or more of e.g. an herbicide, pesticide, insecticide, fungicide, plant growth regulator, nutrient or the like.

Further, as used herein, obtaining the at least one dataset, such as an image, a laser scan or any other suitable data received from a suitable sensor system, may comprise obtaining a dataset or taking an image in real time, which optionally is associated with a geo-specific location on the area of interest to be treated on the spot. In this way, the treatment can be finely adjusted to different situations on the agricultural area in quasi real time while the treatment is conducted. The treatment may hence be subarea specific and finely tuned to the conditions present in the agricultural area. Additionally, treatment can be applied in a very targeted manner leading to more efficient and sustainable farming.

As used herein, the treatment device may be part of a smart farming machinery and may preferably be part of a distributed computing environment. A treatment device may be a driving, flying or any otherwise moving device that travels through or over the agricultural area, such as a ground vehicle, a rail vehicle, an aircraft, a drone, or the like. Further, the smart farming machinery or the treatment device may be, for example, a vehicle, an aircraft, a robot, a sprayer, or the like, with treatment mechanisms attached to it and may comprise a communication and/or connectivity system. The connectivity system may be configured to communicatively couple the treatment device to the distributed computing environment. It may be configured to provide data collected on the treatment device to one or more remote computing resources of the distributed computing environment.

In one embodiment the treatment device includes multiple treatment components, such as spray nozzles for chemical treatment, electric dischargers or lasers for electromagnetic treatment, mechanical grippers for mechanical treatment or a combination thereof, to allow for targeted treatment. In case of chemical treatment, the treatment device includes one or more nozzle(s) to release treatment product to the agricultural area, such as a field for cultivating crop.

Furthermore, the treatment device may comprise one or multiple sensor components, such as image capture devices like cameras, which are configured to take data, such as images, of the agricultural area as the treatment device travels through the agricultural area. Such detection components may be associated with the treatment components, such that the area of interest captured by one detection component is associated with the area of interest treated by one or more treatment components. In case of images as data set the one or more cameras may be RGB cameras, hyperspectral cameras or other suitable optical measurement devices. Each image captured in such a way may be associated with a location and as such provide a snapshot of the real time situation in the location of the agricultural area to be treated. In order to enable a real time, location specific control of the treatment device.

As used herein, a threshold may be basic and/or dynamically adjusted. Basic refers to a preset static or variable threshold, while dynamic refers to a dynamical adjustment preferably of a preset static or variable threshold adjustment based on the determined vegetative indicator. The basic threshold may be determined to be directly or indirectly related to a basic parameter. The threshold adjustment may be determined to be directly or indirectly comparable to the basic parameter and/or the vegetative indicator. In particular, the threshold adjustment may encompass an overwrite of the basic threshold directly or indirectly based on vegetation indicator. Additionally, the basic threshold and dynamic threshold adjustments are by design of the system geolocation specific, since the determining factor for the treatment decision is based on the data set obtained in real-time while the treatment device travels through the agricultural area applying the treatment product.

In some embodiments the vegetative indicator is associated with a threshold adjustment related to the basic parameter. The basic threshold may be understood as a value, the reaching, falling below and/or exceeding of which changes an operation mode of the treatment device and as such the situation and location specific treatment conducted on the agricultural area. The threshold may be understood as a binary value flagging a condition that determines the operation mode of the treatment device and as such the situation and location specific treatment conducted on the agricultural area.

In particular, the threshold determines based on the determined vegetative indicator relating to the real-time conditions on the agricultural area, which operation mode the treatment device or individual treatment component(s) is/are going to be controlled in. In one embodiment the threshold may trigger an on/off decision for individual treatment components based on the basic threshold, the vegetative indicator derived from the obtained dataset, e.g. the image, or the threshold adjustment. Further examples of operation modes may comprise one or more flat rate or broadcast operations in which the same quantity of a treatment product is applied over a defined total area across multiple or all treatment components, a variable rate application (VRA) operation in which, e.g. based on a map, a first quantity of a treatment product is applied over multiple sub-areas, such as a first subarea, a second subarea, etc., and/or or a simple activation or deactivation of the individual treatment components is performed on the spot e.g. for spot spraying. Any such operation mode is performed by providing a corresponding control parameter set with respective control signal(s) for e.g. individual treatment components. Further, different operation modes may correspond to different application rates of the treatment product for one or more of the treatment component(s).

A set of thresholds may include one or more threshold adjustments, preferably with adjustments in relation to the basic threshold. It may be provided by a cloud-based preparation system or by a treatment device-based system as embedded software or by a combination thereof. The set of thresholds may be received prior to treatment on the agricultural area by the treatment device. In such way situation specific control of the treatment device can be accelerated and the processing time can be reduced to a minimum such that the situation specific treatment can be applied while the treatment device traverses through the agricultural area with minimum loss in travelling speed. Thus, decisions can be made on the fly while the treatment device travels, e.g. traverses, through the agricultural area, e.g. field, and captures location specific data, such as images, of the agricultural area locations to be treated.

The vegetative indicator may be a plant indicator, a crop indicator, a weed indicator, an insect indicator or any combination thereof. In case of volunteer crops, e.g. those not cultivated in the present season, may be considered weed in certain scenarios. The vegetative indicator is an indicator reflecting certain conditions on the agricultural area based on real-time datasets collected during travel of the treatment device through the field. In one embodiment the plant indicator signifies a plant growth stage and/or a number of plants. Plant may be a crop and/or a weed. In a further embodiment the weed indicator may relate to weed specie or weed type, weed growth stage and/or number of weeds. In yet a further embodiment a crop indicator may alternatively or additionally be used as vegetative indicator relating to crop growth stage and/or number of crops. In yet a further embodiment the insect indicator may alternatively or additionally be used as vegetative indicator relating to insect specie or insect type, insect population and/or number of insects.

In an embodiment, the determined vegetative indicator includes one or more vegetative specie(s) or vegetative type(s) detected in the obtained dataset, such as the at least one image. In another embodiment of the vegetative indicator, a dynamic set of threshold adjustments relating to one or more vegetative specie(s) or vegetative type(s) is provided to the control system. In such embodiment, the set of dynamic threshold adjustments may include at least one threshold adjustment for one or more vegetative specie(s) and/or vegetative type(s).

Preferably, the set of dynamic thresholds includes threshold adjustments for a limited number of critical or beneficial vegetative specie(s) and/or vegetative type(s). In case critical vegetative objects the threshold adjustment may result in more on-decisions for individual treatment components (situation and location specific for each treatment component) to kill such objects, while in case of beneficial vegetative objects the threshold adjustment may result in more off-decisions for individual treatment components (situation and location specific for each treatment component) to have beneficial objects survive. This way the computational time required for determining vegetative specie(s) or type(s) may be reduced. The set of dynamic thresholds may include more than one level of threshold adjustments depending on the level of criticality of one or more vegetative specie(s) and/or vegetative type(s), wherein one level of threshold adjustment corresponds to one criticality class including specific vegetative specie(s) and/or vegetative type(s). Such embodiments may be implemented for insect or weed treatment depending on insect or weed species or insect or weed types. Such embodiments add to reduction of computational power and time required for real-time decision making on the fly, while the treatment device travels through the agricultural area.

In a further embodiment the set of dynamic thresholds includes area-specific threshold adjustments for one or more vegetative specie(s) and/or vegetative type(s). Such area specific threshold adjustments may be used for insect or weed specie(s) and/or type(s). In such a case threshold adjustments or basic threshold specifically relating to the agricultural area to be treated may be provided.

In a further embodiment the threshold is dynamically adjusted based on the vegetative indicator, if the vegetative indicator includes at least one vegetative specie or vegetative type detected in the dataset, such as the image, that is associated with a threshold adjustment in the set of dynamic thresholds provided. The threshold may be dynamically adjusted based on the insect or weed indicator, if the insect or weed indicator includes at least one insect/weed specie or insect/weed type detected in the dataset, such as the image, that is associated with a threshold adjustment in the set of dynamic thresholds provided.

In a further embodiment vegetative metadata associated with the area to be treated is provided to the control system, and the dynamic adjustment of threshold is activated based on vegetative metadata. Such metadata may include area specific weed specie(s) or type(s), area specific insect specie(s) or type(s), area specific activation codes signifying that the agricultural field to be treated is registered with a service for dynamic threshold adjustment.

In a further embodiment a basic threshold for triggering application of the treatment product relating to a basic parameter is provided to the control system, wherein the dataset, e.g. the image, is analyzed to determine the basic parameter, and wherein the control signal is provided to control the treatment device based on the determined basic parameter and the basic threshold. The basic parameter may relate to a percentage of weed coverage in the area of interest or a percentage of insect presence in the area of interest. The basic parameter may further relate to a binary value fulfilling conditions for the treatment decision. The basic parameter may also include a combination of binary and value-based parameters.

In a further embodiment the vegetative indicator is determined based on a classification of vegetative species and/or types detected in the dataset, e.g. the image. The determining of the vegetative indicator may be performed by use of a data driven model, wherein the data driven model is used to analyze the dataset, e.g. the image, for determining the vegetative indicator. The data-driven model may determine the vegetative indicator based on segmentation or attention mechanisms.

The vegetative indicator may be determined by providing the dataset, e.g. the image, to a data driven model segmenting one or more vegetative object(s), such as insect(s) or weed(s), and classifying detected object(s) according to vegetative specie(s) and/or vegetative type(s) based on such segmentation. The vegetative indicator may be determined by providing the dataset, e.g. the image, to a data driven model generating metadata comprising a region indicator signifying an dataset, e.g. the image, location of one or more vegetative object(s) in the obtained dataset, e.g. the image, and providing the vegetative indicator associated with the dataset, e.g. the image, wherein the data driven model is configured to have been trained with a training dataset comprising multiple sets of examples, each set of examples comprising an example dataset, e.g. image, of one or more vegetative object(s) in an example area and associated example metadata comprising a region indicator signifying an dataset, e.g. image, location of one or more vegetative object(s) in the example dataset, e.g. the image, and an example vegetative indicator associated with the dataset, e.g. the image. Such analysis may be conducted for insects or weeds as vegetative objects relating to insect or weed indicator, respectively.

In one embodiment the data driven model may be embedded in the treatment device. In a further embodiment such models may be stored in a cloud-based system optionally associated with area specific tags. Once a farmer subscribes to the service providing the location of the field in question the trained data-driven model suitable or associated with such location may be downloaded to the treatment device. Such down-/upload may occur once at service registration or regularly when updates of the trained model are available. This way download traffic can be reduced, and the most recent model can be provided to be readily available on the agricultural area.

In case of a plant indicator a dynamic set of thresholds relating to the plant indicator may be provided to the control system. In one embodiment as in the case of any other indicator the basic threshold for triggering application of the treatment product relating to a basic parameter may be provided to the control system, wherein the dataset, e.g. the image, may be analyzed to determine the basic parameter, and wherein the control signal may be provided to control the treatment device based on the determined basic parameter and the basic threshold. In one embodiment, the basic parameter relates to a percentage of plant coverage in the area of interest, in particular a weed coverage and/or a crop coverage.

In a further embodiment the plant indicator is a crop indicator relating to crop number value and/or crop size value. In another embodiment the plant indicator is a weed indicator relating to weed number value and/or weed size value. Based on the weed size value a basic or dynamic application rate to be applied to the agricultural area may be determined and a corresponding control signal may be generated to control the treatment device based on the determined application rate.

The plant indicator may be a relative indicator relating to a plant density or a ratio between weed coverage and crop coverage. In particular crop density may be used as the plant indicator to control plant growth regulator and/or fungicide application to the agricultural area.

In a further embodiment the plant metadata associated with the agricultural area to be treated is provided to the control system, and the dynamic adjustment of threshold is activated based on plant metadata. Such metadata may include area specific plant information, such as crop growth stages or weed spectra from historical data, or an area specific activation code signifying that the agricultural field to be treated is registered with a service for dynamic threshold adjustment.

In a further embodiment the step of determining the plant indicator is performed by use of a data driven model, wherein the data driven model is used to analyze the dataset, e.g. the image, for determining the plant indicator. The data-driven model may determine the plant indicator based on segmentation or attention mechanisms. The vegetation indicator may be determined by providing the dataset, e.g. the image, to a data driven model segmenting one or more plant(s) and providing the vegetation index based on such segmentation. The vegetation indicator may be determined by providing the dataset, e.g. the image, to a data driven model generating metadata comprising a region indicator signifying a dataset, e.g. an image, location of a plant in the obtained dataset, e.g. image, and providing the plant indicator associated with the dataset, e.g. the image, wherein the data driven model is configured to have been trained with a training dataset comprising multiple sets of examples, each set of examples comprising an example dataset, e.g. image, of one or more plants in an example area and associated example metadata comprising a region indicator signifying an dataset, e.g. image, location of a plant in the example dataset, e.g. image, and an example plant indicator associated with the dataset, e.g. the image.

Any disclosure related with respect to the methods above also relates to the treatment device, the control system and the computer program element or machine readable medium and vice versa. Advantageously, the benefits provided by any of the above aspects and examples equally apply to all of the other aspects and examples and vice versa. These and other aspects of the present invention will become apparent from and elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
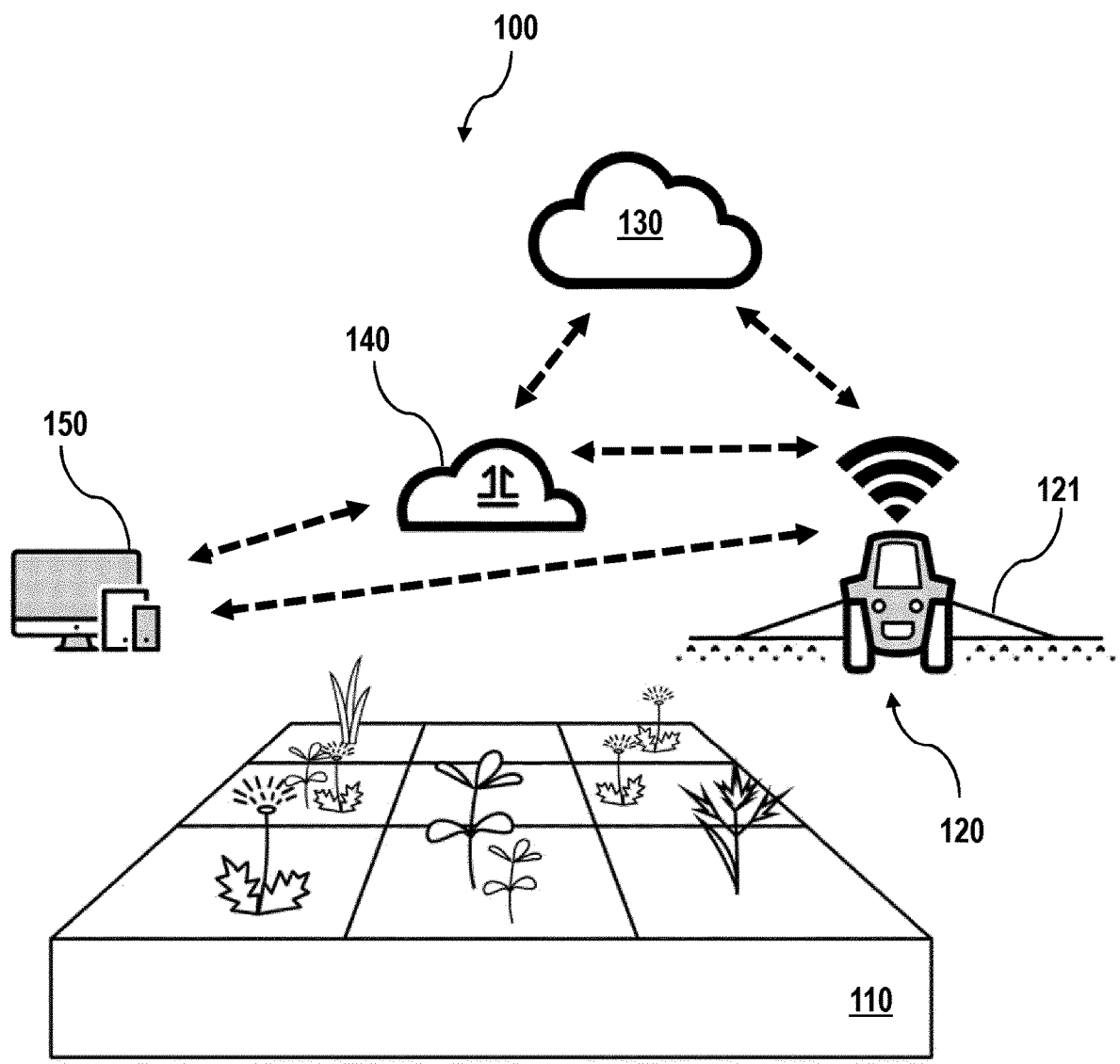
FIG. 1 shows a distributed computing environment and/or system for plant protection, according to an embodiment.

FIG. 1 shows a general overview of a system 100 that is configured for treatment on or at an agricultural area 110, at or on which e.g. crops are to be cultivated. The agricultural area 110 may to be treated by use of a treatment product, which may also be referred to as an agrochemical, e.g. an herbicide, pesticide, insecticide, fungicide, or the like. Further, the agricultural area 110, may be any plant or crop cultivation area, such as a field, a greenhouse, or the like, at a geo-referenced location. As indicated in FIG. 1 by interlines, the agricultural area 110 may optionally be divided into two or more subareas.

The system 100 may comprise or form a distributed computing environment. It may comprise one or more of a treatment device 120, a first computing resource or means 130, a second computing resource or means 140, and a third computing resource or means 150. The treatment device 120 and/or the first, second and third computing means 130, 140, 150, may at least partly be remote to each other. At least some of the treatment device 120 and the first, the second and the third computing means 130, 140, 150 may comprise one or more of a data processing unit, a memory, a data interface, a communication interface, etc. Within the system 100, the treatment device 120 and the first, the second and the third computing means 130, 140, 150 may be configured to communicate with each other via communication means, such as a communications network, as indicated in FIG. 1 by dashed lines between the entities 120, 130, 140 and 150.

The treatment device 120 may also be referred to as a smart farming machinery. The treatment device 120 may be e.g. a vehicle, such as a tractor or the like, an aircraft, a robot, a smart sprayer, or the like, and may be configured to be operated, for example, computer-aided, by a remote control and/or at least semi-autonomous. The treatment device 120 may, for example, comprise and/or carry a treatment product application device 121, which may be e.g. a spraying device for application of a treatment product as described above.

The first computing means 130 may be a data management system configured to send data to the treatment device 120 and/or to receive data from the treatment device 120. For example, the data received from the plant treatment 120 may comprise one or maps, such as a growth distribution map, a weed distribution map, or the like, which may be generated and/or provided based on data recorded during operation of the treatment device 120 and/or application of the treatment product at or on the agricultural area 110.

The second computing means 140 may be a field management system configured to generate and/or provide a control parameter set, which may comprise one or more of control data for operating the treatment device 120, a control protocol, an activation code, a set of threshold adjustments or a basic threshold, a decision logic to the treatment device 120, and/or to receive data from the treatment device 120. Such data may also be provided and/or received through the first computing means 130.

The third computing means 150 may be a client computer configured to receive client data from and/or to provide data to at least the second computing means 140 and/or the treatment device 120. Such client data may, for example, comprise an application schedule for the treatment product to be applied on a specific agricultural area by operating the treatment device 120. Additionally or alternatively, the client data may comprise field analysis data to provide insights into the health state, weed information, plant or crop information, geo-location data, or the like, of a specific agricultural area.

Further, when data is monitored, collected and/or recorded by the treatment device 120, such data may be distributed to one or more of, or even to every, computing means 130, 140, 150 of the distributed computing environments.

Figure 2:
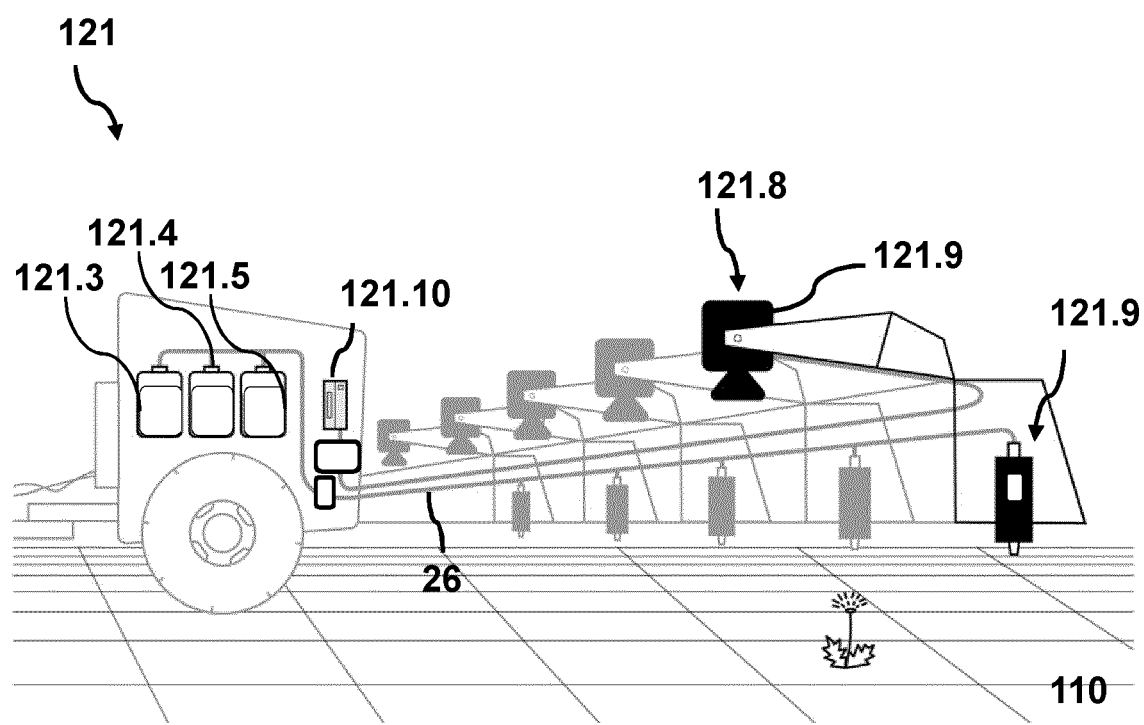
FIG. 2 shows an example of a treatment device and/or treatment product application device, according to an embodiment.
Figure 3:
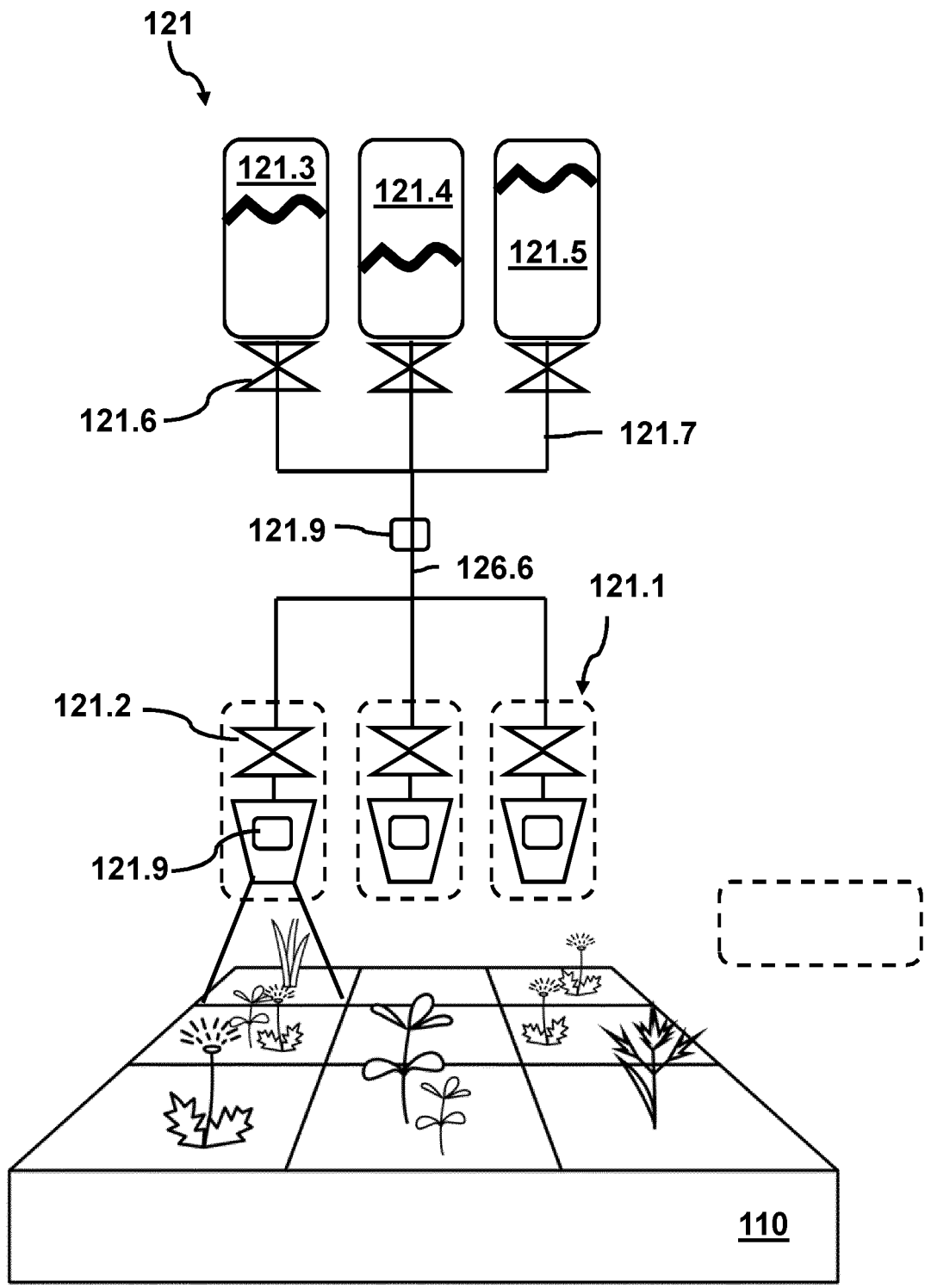
FIG. 3 shows a more detailed, specific example of a treatment device and/or treatment product application device, according to an embodiment.

FIG. 2 shows an example of the treatment product application device 121, and FIG. 3 shows a more detailed, specific example of the treatment product application device 121. It is noted that FIGS. 2 and 3 are merely schematics, illustrating main components, wherein the treatment product application device 121 may comprise more or less components than actually shown. In particular, the application device 121, e.g. its fluidic set up as shown, may comprise more components, such as dosing or feed pumps, mixing units, buffer tanks or volumes, distributed line feeds from multiple tanks, back flow, cyclic recovery or cleaning arrangements, different types of valves like check valves, ½ or ⅔ way valves and so on. Also different fluidic set ups and mixing arrangements may be chosen. The present disclosure is, however, applicable to all fluidic setups.

The treatment product application device 121 shown in FIGS. 2 and 3 is part of the treatment device 120 (as shown in FIG. 1) for applying the treatment product on the agricultural area 11 or on one or more subareas thereof. The treatment product application device 121 may be releasably attached or directly mounted to the treatment device 120. In at least some embodiments, the treatment product application device 121 comprises a boom with multiple spray nozzles 121.1 arranged along the boom of the treatment product application device 121. The spray nozzles 121.1 may be fixed or may be attached movable along the boom in regular or irregular intervals. Each spray nozzle 121.1 may arranged together with one or more, preferably separately, controllable valves 121.2 to regulate fluid release from the spray nozzles 121.1 to the agricultural area 110.

One or more tank(s) 121.3, 121.4, 121.5 are in fluid communication with the nozzles 121.1 through one or more fluidic lines 121.6, which distribute the one or more treatment products as released from the tanks 121.3, 121.4, 121.5 to the spray nozzles 121.1. This may include chemically active or inactive ingredients like a treatment product or mixture, individual ingredients of a treatment product or mixture, a selective treatment product for specific weeds, a fungicide, a fungicide or mixture, ingredients of a fungicide mixture, ingredients of a plant growth regulator or mixture, a plant growth regulator, water, oil, or any other treatment product. Each tank 121.3, 121.4, 121.5 may further comprise a controllable valve 121.6 to regulate fluid release from the tank 121.3, 121.4, 121.5 to fluid lines 121.7. Such arrangement allows to control the treatment product or mixture released to the agricultural area 110 in a targeted manner depending on the conditions determined for the agricultural area 110.

For monitoring and/or detecting, the treatment device 120 (as shown in FIG. 1) and/or the treatment product application device 121 may comprise a detection system 121.8 with multiple detection components 121.9 arranged along e.g. the boom. The detection components 121.9 may be arranged fixed or movable along the boom in regular or irregular intervals. The detection components 121.9 are configured to sense one or more conditions of the agricultural area. The detection components 121.9 may be an optical detection component 121.9 providing an image of the field. Suitable optical detection components 121.9 are multispectral cameras, stereo cameras, IR cameras, CCD cameras, hyperspectral cameras, ultrasonic or LIDAR (light detection and ranging system) cameras. Alternatively or additionally, the detection components 121.9 may comprise further sensors to measure humidity, light, temperature, wind or any other suitable condition on the agricultural area 110.

In at least some embodiments, the detection components 121.9 may be arranged perpendicular to the movement direction of the treatment product application device 121 and in front of the nozzles 121.1 (seen from drive direction). In the embodiment shown in FIG. 2, the detection components 121.9 are optical detection components and each detection component 121.9 is associated with a single nozzle 121.1 such that the field of view comprises or at least overlaps with the spray profile of the respective nozzle 121.1 on the field once the nozzle reach the respective position. In other arrangements each detection component 121.9 may be associated with more than one nozzle 121.1 or more than one detection components 121.9 may be associated with each nozzle 121.1.

The detection components 121.9, the tank valves 121.6 and/or the nozzle valves 121.2 are communicatively coupled to a control system 121.10. In the embodiment shown in FIG. 2, the control system 121.10 is located in a main treatment product application device housing 121.11 and wired to the respective components. In another embodiment detection components 121.9, the tank valves 121.6 or the nozzle valves 121.2 may be wirelessly connected to the control system 121.10. In yet another embodiment more than one control system 121.10 may be distributed in the treatment product application device housing 121.11 or the tractor and communicatively coupled to detection components 121.9, the tank valves 121.6 or the nozzle valves 121.2.

The control system 121.10 may be configured to control and/or monitor the detection components 121.9, the tank valves 121.6 or the nozzle valves 121.2 based on a control parameter set and/or following a control protocol. In this respect, the control system 121.10 may comprise multiple electronic modules. One module for instance controls the detection components 121.9 to collect data such as an image of the agricultural area 110. A further module analyses the collected data such as the image to derive parameters for the tank or nozzle valve control. Yet further module(s) control(s) the tank valves 121.6 and/or nozzle valves 121.2 based on such derived parameters.

Figure 4:
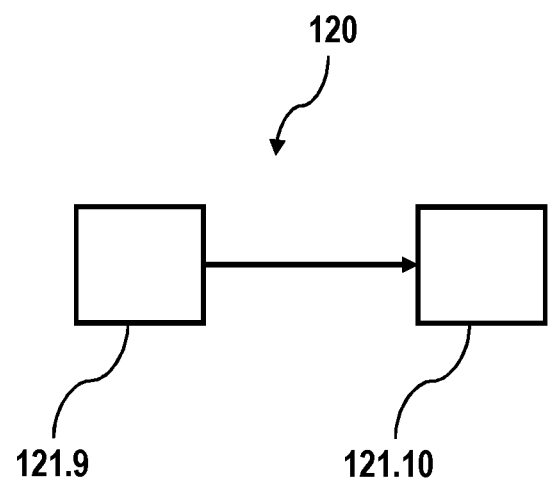
FIG. 4 shows in a block diagram a computing means of a distributed computing environment for plant protection, according to an embodiment.

FIG. 4 shows in a block diagram a computing means of a computing environment for controlling the treatment device 120. As described above, the treatment device 120 comprises or is communicatively coupled to the control system 121.10, which comprises or may be formed by at least one data processing unit, and at least one image capturing device, which may be part of the detection components 121.9 as described above. The image capturing device 121.9 is operatively or communicatively connected to the control system 121.10 and is configured to provide one or more images of the area of interest to the control system 12.10, e.g. as image data which can be processed by the data processing unit.

It is noted that both capturing the at least one image by the image capturing device 121.9 and processing the same by the control system 121.10 is performed onboard or through communication means during operation of the treatment device 120, i.e. in real-time. It may further be noted that any other dataset than image data providing field conditions may be used.

Further, in at least some embodiments, the control system 12.10 and/or its data processing unit determines from the at least one image a vegetative indicator relating to real-time conditions on the agricultural area, wherein a basic threshold for triggering application of the treatment product is dynamically adjustable in relation to the vegetative indicator. Then a control signal is generated and provided to control the treatment device based on the determined vegetative indicator and the threshold for triggering application of the treatment product.

Accordingly, the control system 12.10 and/or its data processing unit obtains at least one dataset, such as an image, relating to an area of interest within the agricultural area to a control system, wherein the at least one dataset is obtainable or obtained in real-time while the treatment device traverses through the agricultural area 110. The control system 12.10 may obtain images of an area of interest of the agricultural area 110. The control system 12.10 and/or its data processing unit analyses the at least one image to determine at least one vegetative indicator associated e.g. with one or more specific weed types or weed species.

The vegetative indicator may be a plant indicator, a crop indicator, a weed indicator, a insect indicator or any combination thereof. The vegetative indicator is an indicator reflecting certain conditions on the agricultural area based on real-time datasets. In one embodiment the plant indicator signifies a growth stage of the plant and/or a number of plants. Plant may be a crop and/or a weed. In a further embodiment the weed indicator may relate to weed specie or weed type, weed growth stage and/or number of weeds. In yet a further embodiment a crop indicator may alternatively or additionally be used as vegetative indicator relating to growth stage and/or number of crops. In yet a further embodiment the insect indicator may relate to insect specie(s) or insect type(s), insect population and/or number of insects.

In at least some embodiments, the control system 12.10 and/or its data processing unit determines the vegetative indicator, and potential threshold adjustments to the basic application threshold. This may be determined dependent on e.g. one or more of a weed coverage, a number of weeds, and/or an amount of weed determined to be present in the area of interest.

The control system 12.10 and/or its data processing unit determines, dependent on the vegetative indicator, a threshold adjustment value used to increase or decrease the basic threshold by the adjustment value or by adding a Boolean condition. In other words, the basic threshold, which is e.g. based on only the weed coverage, is adjusted, if e.g. a weed type or species is detected that is critical for the area of interest and/or the agricultural area 110.

After determining the adjusted threshold, the control system 12.10 and/or its data processing unit generates a control parameter set comprising a control signal based on the vegetative indicator and the adjusted application threshold, based on which certain spray nozzles of the treatment device 120 are controlled to apply treatment product. For example, dependent on the control parameter set, the treatment product application device 121 may be controlled to perform a simple activation or deactivation of certain nozzles for spot spraying. It is noted that different operation modes may also correspond to different application rates of the treatment device 121.

In the analysis the image may be segmented with respect to plant/no plant areas discerning weed or crop from ground. In one embodiment a crop row may be used to discern weed and crop. E.g. via pixel colors, the crops are detected based on the geometrical arrangement in rows, the crops are disregarded, and the remaining plant parts are tagged as weed. A weed coverage, number of weeds or an amount of weed may be determined for the non-crop area based on color or infrared portion of weed detected in the image. In one embodiment weed coverage may be defined as the number of pixels characteristic for weed in relation to the pixels of the field section or the pixels of the non-crop area. One such method is described in WO201902077A1.

In a further step the number of weeds optionally attached with their growth stage may be recognized based on an additional processing layer that detects individual weeds and optionally their growth stage. The growth stage of the weed may e.g. be estimated based on size of the weed from the image. If one large weed is recognized the threshold may be lowered and/or the dose rate may be adjusted to a higher rate. If multiple small weeds are recognized the threshold may be increased and/or the dose rate may be adjusted to a lower rate.

The model to determine vegetative indicator or basic parameter may be built based on data-driven models such as neural networks like convolutional neural networks or data-driven models with attention mechanisms. In particular the latter technique includes a region indicator included into the training data of the data driven model. Image background is in such cases not important, and no discrimination is required. A segmentation step may hence not be required. Such data driven model hence enables fast and efficient processing even on cheap hardware. Other image recognition algorithms may be suitable, if multi weed detection on a per weed level is possible.

Additionally, the crop growth stage may be recognized on the image (preferred) or derived from a growth stage model for the crop. Such information can be used to further adjust the threshold dose rate based on competitiveness or crop sensitivity with respect to the weed. Generally, the logic follows: The smaller the crop the more sensitive it is e.g. to weed and the smaller the threshold for application. The larger the crop the less sensitive it is e.g. to weed and the higher the threshold can be set. Furthermore, the threshold may be dynamic as of crop growth stage may be variable across the field. Such dynamic threshold may be determined e.g. based on the ratio of weed coverage ("weed to all") and crop coverage ("crop too all"). Alternatively or additionally the relative sizes or numbers of weed and crop may be taken into account to dynamically adjust the threshold. A dynamic threshold may further depend on the crop growth stage (bbch) as provided from user. Furthermore, data from seeding stage or image analysis at early emergence stage may be included. Such processing may be ingested from earlier determination prior to application to reduce real-time processing load. From such data the crop count per row may be determined giving the crop density. Similarly a weed count (or weed density) and/or weed size (average or classified by size) may be determined based on the image and respective analysis. With weed density, crop density and their respective sizes a more robust threshold logic may be implemented. Additionally depending on the number of weeds and/or the weed growth the dose rate or application rate (e.g. the amount of herbicide applied) may be adjusted dynamically.

In one embodiment the trained model and any threshold/dose rate logic may be embedded in the treatment device 120. In a further embodiment such logics and trained models may be stored in a cloud-based system associated with rea specific tags. Once a farmer subscribes to the service providing the location of the field in question either manually or automatically e.g. through the GPS of the treatment device the trained model suitable or associated with such location may be downloaded to the treatment device. Such down-/upload may occur once at service registration or regularly when updates of the trained model are available. This way download traffic can be reduced, and the most recent model can be provided to be readily available on the field.

In a further step, the weed species/type may be recognized based on an additional analysis layer (or security layer) or integrated into the first layer that classifies the weed species/type. One option is to use a conventional classifying convolutional neural network (CNN) for such analysis. In other options more advanced techniques including attention mechanisms may be used. Such security layer ensures that not only the weed coverage, weed growth stage or weed number, but also the weed species/type can be used in the control mechanism for a spray decision.

The trained model may include parallel model architecture with more than one trained model for one or more weed species/types or a single model architecture with one model for all weed species/types. To further enhance processing, The trained model identifying the weed species/type may be trained for a limited number of weeds. E.g. it may be trained to recognize weeds common to the specific field or region.

In one embodiment the trained model may be embedded in the hardware system. The weed coverage may be calculated in a first layer with thresholds only based on the weed coverage providing the base functionality for the hardware. An additional layer may include the "species detector" that would overrule the first layer. Alternatively, to overruling the weed coverage and the "species detector" may determine the threshold from e.g. a two-dimensional look up table. Could be even calculated on separate hardware with better computing power.

In a further embodiment such trained models may be stored in a cloud-based system like field manager and associated with locations. Once a farmer subscribes to the service providing the location of the field in question the trained model suitable or associated with such location may be downloaded to the treatment device 120. Such download may occur once at service registration or regularly when updates of the trained model are available. This way download traffic can be reduced, and the most recent model can be provided to be readily available on the field.

To reduce required storage and processing capacities, the trained model may be restricted to a limited number of critical weeds species/types. Critical weed species/types are those that have a high negative impact on yield and food safety, or they belong to the increasing number of herbicide resistant weeds. Depending on the outcome of the security layer critical weed species/type or not, the threshold may be further adapted. E.g. if the weed coverage does not reach the threshold, but a critical weed species/type is detected, the threshold is adapted dynamically to a lower level, i.e. the nozzle/valve activated despite lower weed coverage value or even be controlled in zero tolerance mode (threshold zero). Overall the threshold may be implemented via a one-dimensional look up table or a multi-dimensional decision tree assigning a threshold to weed coverage values and including a further logic on weed species/types.

In a further embodiment a further logic layer with multiple levels of criticality for different weed species/types may be added. Here different thresholds may be associated to the different weed species/types depending on their criticality.

In a further embodiment the security layer and respective logic layers may only be activated, if critical weed species/types are detected for the field of interest. Such information may be meta data attached to a field and set e.g. manually or automatically through current or historic field data. E.g. images taken e.g. by a smart phone signifying the status of the field in one or multiple spots may be used to determine such meta data of the field. The data may include field location, critical weed species/type yes or no and optionally the critical weed species/type.

In one embodiment the additional logic described herein may be run directly on the control system 120.10. To save processing needs the models built for image detection may be compressed. Additionally, any image taken on the field may be stored and transmitted to cloud environment for further training purposes of the models. Such model updates may become field specific as soon as enough images of the specific field of interest or surrounding fields are available. The user may have the option to choose a more tailored model approach to further increase saving potential. In such a case each model may be attached to a specific field specified via metadata identifier. If a user in the proximity of such field opts for more tailored version, such model will be downloaded onto the smart sprayer system either directly or onto an in-field kit connectable to the treatment device.

In at least some embodiments, the control system 12.10 and/or its data processing unit determines the adjustment value by extraction from or readout of a one-dimensional or multi-dimensional look-up table that assigns a correspondence between a specific weed type or weed species and at least one adjustment value. This look-up table may be stored locally within the plant protection device 120 or remotely in e.g. one or more of the first computing means 130, the second computing means 140, and the third computing means 150. Further, control system 12.10 and/or its data processing unit may be further configured to determine the adjustment value by providing the at least one image to a classifying computational model configured to determine a correspondence between a specific weed type or weed species and at least one adjustment value. For this purpose, a conventional classifying convolutional neural network (CNN) may be utilized. Additionally or alternatively, a computational data driven model may be utilized, which data driven model may be configured to be applied to the obtained at least one image and to generate metadata comprising at least one region indicator signifying an image location of the one or more agricultural objects in the received image and an agricultural object label associated with the at least one region indicator. Further, the data driven model may be configured to have been trained with a training dataset comprising multiple sets of examples, each set of examples comprising an example image of one or more agricultural objects in an example field and associated example metadata comprising at least one region indicator signifying an image location of the one or more agricultural objects in the example image and an example agricultural object label associated with the at least one region indicator. The control system 12.10 and/or its data processing unit may be further configured to, based on the data driven model, such as a CNN, with an attention mechanisms and/or an agricultural region indicator included into the training data of the data driven model. Thereby, image background is not important, and no discrimination is required. During the training, images with multiple agricultural objects, e.g., weeds, diseases, leaf damages, may be collected and annotated. The annotation includes a region indicator e.g. in form of a rectangular box marking each agricultural object and respective agricultural object label, such as weed species, surrounded by the box. For some agricultural objects, such as disease or nitrogen deficiency recognition, the region indicator may be a polygon for better delineating the contour of the disease or nitrogen deficiency. Once the data driven model is trained and adheres to predefined quality criteria, it will either be made available on a server, cloud etc., or a mobile device. In the latter case compression may be required, e.g. via node or layer reduction taking out those nodes or layers not triggered that often (in <x % of processed images).

In at least some embodiments, the computational model considers a geo-referenced location of the specific agricultural area 110 and/or area of interest, and/or subareas thereof.

Further, in at least some embodiments, the indicator and/or the weed type or weed species is assigned in a geolocation-specific manner to the specific agricultural area and/or area of interest. Preferably, the indicator takes into account a vulnerability of the specific agricultural area and/or area of interest to one or more different weed types or weed species. For example, the indicator and/or the weed type or weed species are stored in a look-up table, a knowledge database, etc. Furthermore, in at least some embodiments, to the weed type or weed species its level of criticality for the specific area of interest is assigned. Thereby, the adjustment value may be determined dependent on the level of criticality. For example, the basic threshold may be increased if the level of criticality is rather low, wherein the basic threshold may be decreased if the level of criticality is rather high.

In at least some embodiments, the control system 12.10 and/or its data processing unit determines the adjustment value dependent on geo-referenced location data of the specific agricultural area and/or area of interest. Thereby, the geo-referenced location data may, for example, be obtained from a remote data source, such as one or more of the first computing means 130, the second computing means 140, and the third computing means 150.

Further, in at least some embodiments, one or more of the first, second and third computing means 130, 140, 150 (see FIG. 1) may be configured to store at least one data set assigned in a geolocation-specific manner to a specific agricultural area and/or area of interest, the data set comprising one or more of a computational model trained to determine the basic application threshold and/or to determine the adjustment value used to increase or decrease the basic application threshold by the adjustment value.

Similar methods and system treating weed and relating to weed indicator described above may also be implemented for insects.

Figure 5:
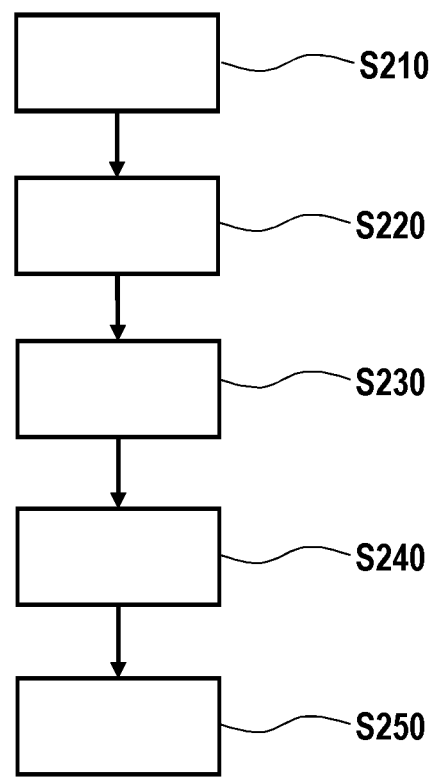
FIG. 5 shows in a flow chart a method for controlling a treatment device.

FIG. 5 shows in a flow chart a method 200 for controlling operation of the treatment device 120.

According to a first aspect, provided herein is a method for controlling a treatment device applying a treatment product to an agricultural area, the method comprising:

In step 210, the control system 12.10 and/or its data processing unit obtains the at least one dataset of an area of interest within an agricultural area, wherein the at least one data set is taken during real-time travel operation of the treatment device 120 through the agricultural area 110. In a step S220, the control system 12.10 and/or its data processing unit determines from the dataset a vegetative indicator relating to real-time conditions on the agricultural area, while the treatment device travels through the agricultural area. In step 230, a basic threshold for triggering application of the treatment product is dynamically adjusted in relation to the vegetative indicator. In step S240, a control signal is generated by the control system 12.10 to control the treatment device 120 based on the determined vegetative indicator and the threshold for triggering application of the treatment product.

In an optional step S250, the control system 12.10 and/or its data processing unit operates the treatment device 120 dependent on the control signal. Further optionally, data, such as model data, imaging data, detection data, or the like, may be provided to one or more of the first computing means 130, the second computing means 140, and the third computing means 150, where these data may be further processed, stored, distributed, etc.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as an ASIC, a storage chip, a RAM or the like, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matter. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for operating a treatment device applying a treatment product to an agricultural area, the method comprising:
   obtaining at least one dataset of an area of interest within the agricultural area to a control system;
   determining, by the control system, from the at least one dataset a plant indicator, wherein a basic threshold for triggering application of the treatment product is dynamically adjustable in relation to the plant indicator, wherein the dynamic adjustment of the basic threshold includes a dynamic threshold for threshold adjustment relating to an association between detection of vegetative specie(s) and/or vegetative type(s) and coverage of the vegetative specie(s) and/or vegetative type(s) in the area of interest; and
   providing a control signal, by the control system, to control the treatment device based on the determined plant indicator and the threshold for triggering application of the treatment product.

2. The method according to claim 1, wherein the plant indicator relates to a plant number value and/or a plant size value.

3. The method according to claim 1, wherein a dynamic set of thresholds relating to the plant indicator is provided to the control system.

4. The method according to claim 1, wherein a basic threshold for triggering application of the treatment product relating to a basic parameter is provided to the control system, wherein the dataset is analyzed to determine the basic parameter, and wherein the control signal is provided to control the treatment device based on the determined basic parameter and the basic threshold.

5. The method according to claim 1, wherein the plant indicator is a crop indicator relating to crop number value and/or crop size value.

6. The method according to claim 1, wherein the plant indicator is a weed indicator relating to weed number value and/or weed size value.

7. The method according to claim 6, wherein based on the weed size value an application rate to be applied to the agricultural area is determined and the treatment device is controlled based on the determined application rate.

8. The method according to claim 1, wherein the plant indicator is a relative indicator relating to a plant density or to a ratio between weed coverage and crop coverage.

9. The method according to claim 1, wherein a set of thresholds is provided by a cloud-based preparation system or by a treatment device-based system as embedded software or by a combination thereof.

10. The method according to claim 1, wherein plant metadata associated with the area to be treated is provided to the control system, and the dynamic adjustment of threshold is activated based on plant metadata.

11. The method according to claim 1, wherein the step of determining the plant indicator is performed by use of a data driven model, wherein the data driven model is used to analyze the dataset for determining the plant indicator.

12. A control system for operating a treatment device for applying a treatment product to an agricultural area, wherein the control system is configured to:
 obtain at least one dataset of an area of interest within the agricultural area to a control system;
 determine, by the control system, from the at least one dataset a plant indicator, wherein a basic threshold for triggering application of the treatment product is dynamically adjustable in relation to the plant indicator, wherein the dynamic adjustment of the basic threshold includes a dynamic threshold for threshold adjustment relating to an association between detection of vegetative specie(s) and/or vegetative type(s) and coverage of the vegetative specie(s) and/or vegetative type(s) in the area of interest; and
 provide a control signal, by the control system, to control the treatment device based on the determined plant indicator and the threshold for triggering application of the treatment product.

13. A treatment device for applying a treatment product to an agricultural area, the treatment device comprising:
 at least one detection component, and the control system of claim 12 connected to the at least one detection component.

14. A non-transitory computer-readable medium having instructions encoded thereon that, when executed by a data processing unit, cause the data processing unit to perform the method according to claim 1.

15. The method of claim 1, wherein the dynamic adjustment of the basis threshold includes an overwrite of the basic threshold directly based on the plant indicator.

16. The method of claim 1, wherein the dynamic adjustment of the basic threshold includes an overwrite of the basic threshold indirectly based on the plant indicator.

17. The method of claim 1, wherein the dynamic adjustment of the basic threshold is geo-location specific based on real-time data obtained while the treatment device travels through the agricultural area applying the treatment product.

18. The method of claim 1, wherein the dynamic adjustment of the basic threshold includes dynamic thresholds for threshold adjustments relating to vegetative specie(s) and vegetative type(s).

19. A control system for operating a treatment device for applying a treatment product to an agricultural area, wherein the control system is configured to:
 obtain at least one dataset of an area of interest within the agricultural area to a control system;
 determine, by the control system, from the at least one dataset a plant indicator, wherein a basic threshold for triggering application of the treatment product is dynamically adjustable in relation to the plant indicator, wherein the dynamic adjustment of the basic threshold includes a dynamic threshold for threshold adjustment relating to an association between detection of vegetative specie(s) and/or vegetative type(s) and coverage of the vegetative specie(s) and/or vegetative type(s) in the area of interest, wherein the dynamic adjustment of the basis threshold includes an overwrite of the basic threshold directly and/or indirectly based on the plant indicator, wherein the dynamic adjustment of the basic threshold is geo-location specific based on real-time data obtained while the treatment device travels through the agricultural area applying the treatment product; and
 provide a control signal, by the control system, to control the treatment device based on the determined plant indicator and the threshold for triggering application of the treatment product.

* * * * *